United States Patent
Robertson et al.

(10) Patent No.: US 7,047,744 B1
(45) Date of Patent: May 23, 2006

(54) DYNAMIC HEAT SINK ENGINE

(76) Inventors: Stuart J. Robertson, 12130 Green Rd. South, Wilton, CA (US) 95693; Nils E. Tellier, 245 Dahlia Dr., Louisville, CO (US) 80027

( * ) Notice: Subject to any disclaimer, the term of this patent is extended or adjusted under 35 U.S.C. 154(b) by 15 days.

(21) Appl. No.: 10/944,226

(22) Filed: Sep. 16, 2004

(51) Int. Cl.
*F01K 7/34* (2006.01)
*F01K 25/06* (2006.01)
*F01K 25/10* (2006.01)
*F03G 7/00* (2006.01)

(52) U.S. Cl. .............. 60/670; 60/645; 60/651; 60/653; 60/659; 60/671; 60/684; 290/52

(58) Field of Classification Search .......... 60/645, 60/651, 653, 659, 670, 671, 684; 290/52
See application file for complete search history.

(56) References Cited

U.S. PATENT DOCUMENTS

| | | | |
|---|---|---|---|
| 3,992,891 A | 11/1976 | Pocrnja | |
| 4,185,465 A * | 1/1980 | Shaw | 290/52 |
| 4,329,842 A | 5/1982 | Hoskinson | |
| 4,358,930 A * | 11/1982 | Pope et al. | 60/651 |
| 4,557,112 A * | 12/1985 | Smith | 60/651 |
| 5,392,606 A * | 2/1995 | Labinov et al. | 60/653 |
| 5,816,048 A * | 10/1998 | Bronicki et al. | 60/651 |
| 5,996,355 A | 12/1999 | Jirnov et al. | |
| 6,161,392 A | 12/2000 | Jirnov et al. | |
| 6,606,860 B1 | 8/2003 | McFarland | |
| 6,735,948 B1 * | 5/2004 | Kalina | 60/653 |
| 6,820,421 B1 * | 11/2004 | Kalina | 60/653 |
| 6,857,268 B1 * | 2/2005 | Stinger et al. | 60/651 |
| 6,910,334 B1 * | 6/2005 | Kalina | 60/651 |
| 6,923,000 B1 * | 8/2005 | Kalina | 60/653 |
| 6,960,839 B1 * | 11/2005 | Zimron et al. | 60/651 |
| 6,964,168 B1 * | 11/2005 | Pierson et al. | 60/670 |
| 2003/0000213 A1 * | 1/2003 | Christensen et al. | 60/670 |

* cited by examiner

*Primary Examiner*—Sheldon J Richter
(74) *Attorney, Agent, or Firm*—R. Michael West

(57) ABSTRACT

A dynamic heat sink engine including a storage vessel having a working fluid outlet and a working fluid inlet. The lower portion of the storage vessel contains a cryogenic working fluid, such as liquid hydrogen, at a temperature at near its boiling point. The engine further includes a working fluid circuit extending between the working fluid outlet and the working fluid inlet of the storage vessel. The working fluid circuit includes the serial connection of the following components from the working fluid outlet to the working fluid inlet: a fluid pump; a vaporizer having a liquid line passing therethrough; a heater; an expansion engine having a rotary output shaft; an electrical generator connected to the rotary output shaft of the expansion engine; a vapor line passing through the vaporizer, the vaporizer including a heat exchanger providing thermal communication between the liquid line and the vapor line.

27 Claims, 3 Drawing Sheets

DYNAMIC HEAT SINK ENGINE

CROSS-REFERENCE TO A RELATED APPLICATION

None

BACKGROUND OF THE INVENTION

1. Field of the Invention

The invention relates generally to apparatus for both generating and storing energy through the use of cryogenic fluid as a working fluid. More particularly, the invention pertains to a closed loop heat sink engine, which produces power utilizing low boiling point fluids heated by atmospheric heat or other available heat such as waste heat from a conventional electrical power plant. Additionally, the invention pertains to a heat sink engine capable of storing surplus energy in the form of liquified gas during off-peak production periods, in which the liquified gas is later utilized to produce electrical power during peak or high demand periods.

2. Description of the Prior Art

Electrical power generation plants utilize a number of different energy sources including nuclear, hydroelectric, solar, wind, and fossil fuels. In most regions of the world, fossil fuel power plants relying upon internal or external combustion engines, are still the most common. In such power plants, the combustion of coal or oil is used to increase the energy of a working fluid, such as air or water vapor. Then, the heated working fluid is utilized to drive a turbine and an electrical generator. Finally, the unused heat of the working fluid is transferred to a heat sink, such as the atmosphere.

It is well recognized that fossil fuel driven power plants emit airborne pollutants from the combustion exhaust gases, and increase the temperature of the surrounding atmosphere from the heat rejection. Given modern society's dependence on increasingly large amounts of electrical power, there is an existing need to generate and store electrical power with minimal use of conventional fossil fuel plants so as to lessen the adverse impact they have on the environment.

The general concept of using low molecular weight or low-boiling point fluids for power generation and power storage is appealing. Combustion and heat discharge to the atmosphere would be eliminated. In an ideal system, the diurnal excursions of atmospheric temperature could drive a system and produce electrical power. The design goal for such a system contemplates that the $T_{low}$ component be lowered in order to increase the Carnot efficiency $\eta$ of a power plant ($\eta=(T_{high}-T_{low})/T_{high}$). However, the technical requirements to condense a gas, having a critical temperature which is well below ambient temperature, or to compress a low molecular weight gas such as helium or hydrogen, have deterred commercial applications.

SUMMARY OF THE INVENTION

It has been empirically observed that very little heat is transferred to a cryogenic fluid while it is being pumped. This phenomenon is due to the fact that the isothermal and isentropic properties coincide, for most cryogenic fluids in their sub-cooled state. For example, it has been determined that pumping liquid oxygen from a storage tank and then returning the liquid oxygen into the same tank will suddenly collapse the tank pressure. Consequently, atmospheric heat input to the storage tank has to be increased in order to counter the sub-cooling effect of the pumped oxygen re-circulation. The present invention relies upon this basic principle applied to a closed-loop system having both electrical power production and energy storage applications.

The disclosed heat sink engine is capable of electrical power production if atmospheric heat or another fluid is utilized as a heat source in conjunction with a cryogenic working fluid. In the case of using atmospheric heat, the preferred working fluid would be liquid hydrogen, although other fluids may be used for particular applications. In addition, the disclosed heat sink engine may also be used to store energy in the form of liquified gas during off-peak hours. Later, during peak hours, the stored energy may be utilized by pumping the liquid gas, vaporizing the liquid gas, and then driving an expansion turbo-generator. In this application, the apparatus of the present invention would enhance the efficiency and effectiveness of a conventional power plant by providing a bottoming cycle.

The dynamic heat sink engine includes a storage vessel, having a working fluid outlet and a working fluid inlet. A lower portion of the storage vessel contains a working fluid, such as liquid hydrogen, at a temperature at near its boiling point. The heat sink engine further includes a working fluid circuit extending between the working fluid outlet and the working fluid inlet of the storage vessel.

The working fluid circuit includes the serial connection of the following components from the working fluid outlet to the working fluid inlet: a liquid pump; a vaporizer having a liquid line passing therethrough; a heater; an expansion engine having a rotary output shaft; an electrical generator connected to the rotary output shaft of the expansion engine; a vapor line passing through the vaporizer, the vaporizer including a heat exchanger providing thermal communication between the liquid line and the vapor line.

In operation, the working fluid in a liquid state is pumped to a higher pressure by the liquid pump, vaporized by the heat exchanger, further heated by the heater, and expanded isentropically in the expansion engine. The rotary output shaft of the expansion engine drives the electrical generator, producing electricity. The working fluid exits from the expansion engine in a super-heated state, but at a reduced pressure which is still higher than the pressure within the storage vessel. The working fluid is partially cooled passing through the heat exchanger in the vaporizer. The working fluid, now in a liquid-vapor state, is expanded adiabatically into the storage vessel for its temperature to match that of the working fluid in the storage vessel.

The dynamic heat sink engine further includes a vapor outlet and a liquid inlet in communication with the storage vessel. A liquifier is provided, having an inlet in fluid communication with the vapor outlet and an outlet in fluid communication with the liquid inlet of the storage vessel. A fraction of the adiabatically expanded fluid delivered into the storage vessel flashes to vapor phase and passes through the liquifier, and is returned to the storage vessel as a liquid.

Optionally, a second heat exchanger may be provided in thermal communication with the working fluid circuit. Preferably, the second heat exchanger is located at the output stream from the first heat exchanger and is in thermal communication therewith. The second heat exchanger also has an input and output fluid circuit in thermal communication with the liquifier. This second heat exchanger thereby acts as a heat sink for the liquifier, lowering the heating duties of the heater and also increasing the coefficient of performance of the liquifier.

The heat sink engine shown herein relies upon the safe and proven use of commercially available components such as cryogenic tanks, cryogenic liquid pumps, heat exchangers, expansion engine-generators, and vapor liquifiers. The working fluid for the heat sink engine, preferably liquid hydrogen, is readily available and renewable. The working fluid is maintained preferably above ambient pressure, in order to avoid contamination from atmospheric gas such as wet air. The working fluid is also preferably maintained below critical temperature and pressure. However, providing safe industrial practice of the invention is established, it may be desirable to operate the working fluid below ambient pressure and/or above its critical pressure in order further to increase the efficiency of the heat sink engine.

DETAILED DESCRIPTION OF THE PREFERRED EMBODIMENT

Figure 1:
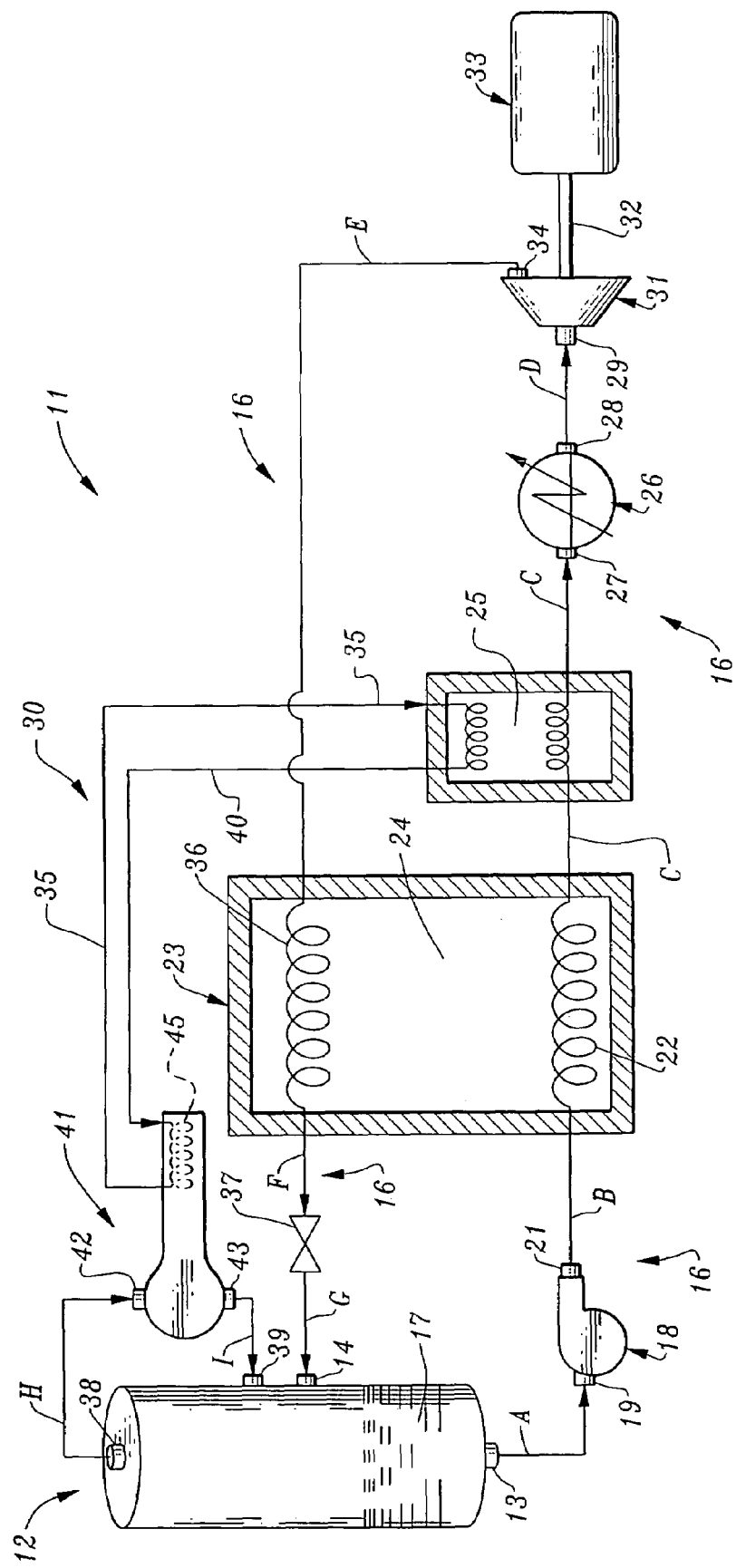
FIG. 1 is a schematic diagram of the dynamic heat sink engine.

Turning now to the drawings, and in particular to FIG. 1, the invention comprises a dynamic heat sink engine 11, including a storage vessel 12 having a working fluid outlet 13 and a working fluid inlet 14. A closed-loop, first working fluid circuit 16 extends between the working fluid outlet 13 and the working fluid inlet 14. A lower portion of storage vessel 12 contains an amount of cryogenic working fluid 17 in liquid form, which is maintained at or near its boiling point. Working fluid 17 is preferably hydrogen, as it is readily available and it is a renewable resource. Other fluids may also be used as the working fluid, such as liquid natural gas or helium.

The working fluid 17 in vessel 12 is preferably maintained approximately 3 to 5 psi above ambient pressure, to prevent contamination from atmospheric gas, such as wet air. Fluid 17 is also maintained below critical temperature and pressure, for apparent safety reasons. If it can be established as safe in an industrial application, it may be desirable to operate the working fluid below ambient pressure, or above its critical temperature and pressure. This would have the effect of further increasing the efficiency of the dynamic heat sink engine.

Figure 2:
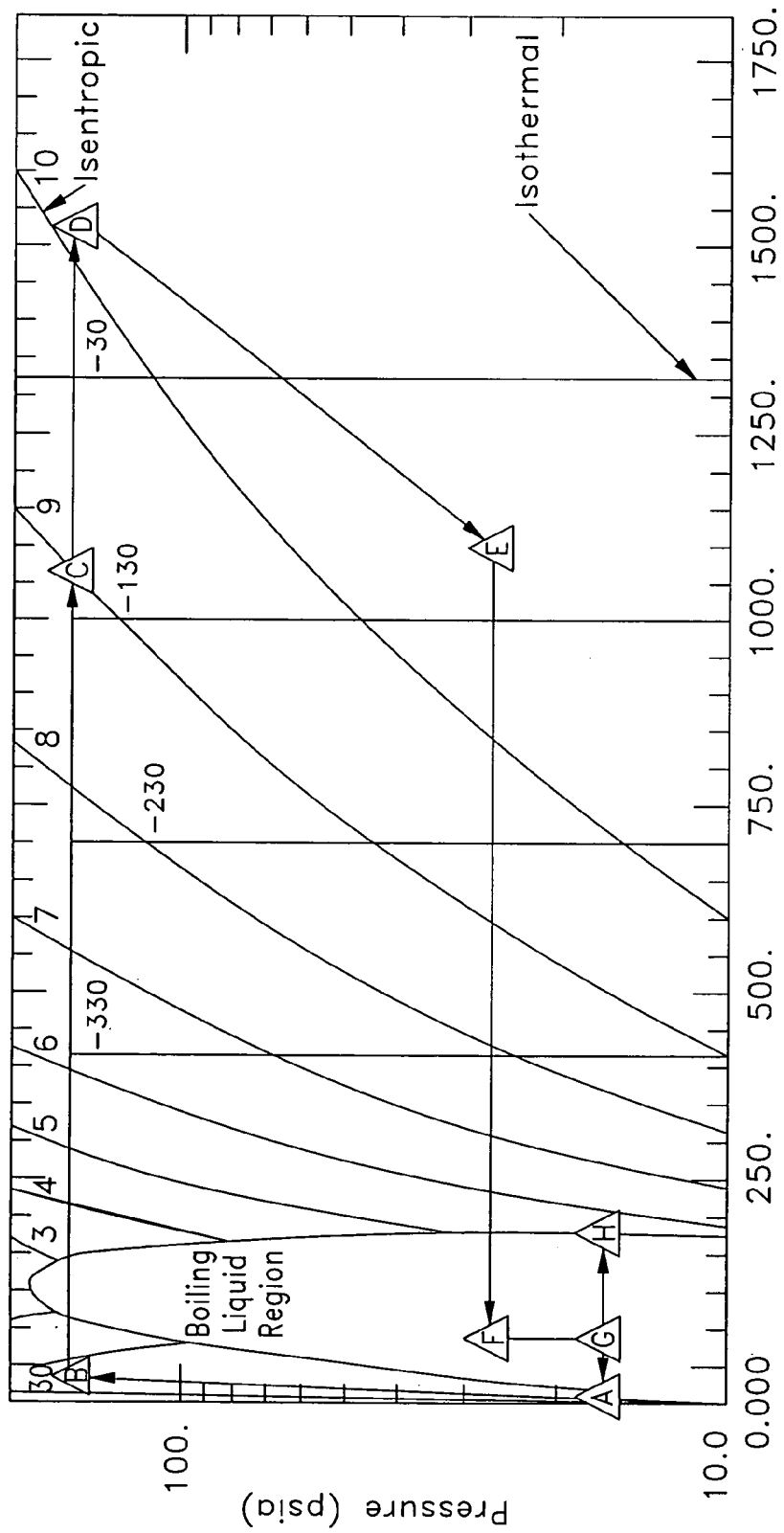
FIG. 2 is a P-H diagram of the states of the working fluid as it circulates through the closed loop of the dynamic heat sink engine; and, FIG. 3 is a schematic diagram of an adaptation of the dynamic heat sink engine to enhance the performance of a conventional gas fired power plant or a fuel cell power plant.

Working fluid circuit 16 has a number of components arranged in serial relation extending from working fluid outlet 13 to working fluid inlet 14. These components are interconnected by fluid streams which are alphabetically identified in FIG. 1. These same alphabetic designations may be cross-referenced to the various states of the working fluid 17, shown in the P-H Diagram of FIG. 2.

The first component in circuit 16 is a cryogenic liquid pump 18, having an inlet 19 and an outlet 21. A first stream A of working circuit 16 extends between working fluid outlet 13 and pump inlet 19. Pump 18 raises the pressure of working fluid 17 to a figure approaching the critical pressure of the fluid. This critical pressure depends primarily upon the molecular weight of the working fluid. For example, using a working fluid such as liquid hydrogen, this pressure would be approximately 160 psi. However, for Liquid Natural Gas, this pressure would be much higher, approximately 500 psi.

A second stream B of circuit 16 interconnects pump outlet 21 with a first end of liquid line 22. Liquid line 22 passes through a vaporizer 23 containing a first heat exchanger 24. Liquid line 22 is in thermal communication with heat exchanger 24, providing sufficient heat to the incoming working fluid to transform it from a liquid at an elevated pressure into a vaporized state.

The next component in circuit 16 is a heater 26, having an inlet 27 and an outlet 28. A third stream C extends between the second end of liquid line 22 and inlet 27 of heater 26. The vaporized working fluid entering heater 26 through stream C is further heated to a superheated state. Heater 26 heats the working fluid isobarically, ensuring that the pressure varies the least in relation to enthalpy at constant entropy, so that $$\frac{\partial P}{\partial H}|_s$$

is minimal. As set forth in Equation 12, of the accompanying Governing Equations, the heater 26 ideally raises the temperature of the working fluid to a temperature which is twice its heat of vaporization.

Heater 26 may employ a wide variety of heat sources depending upon the nature of the working fluid, and the form of the available heat. For example, the heat source for heater 26 could be solar energy, exhaust gases from a combustion process, the atmosphere, the earth, or a body of water. Hydrogen, capable of being superheated at relatively low temperatures, would only have to be raised from −150° to 5° F. in heater 26. Liquid Natural Gas, on the other hand, would have to be raised in temperature in heater 26 from approximately 360° to 720° F. One of ordinary skill in the art can readily select the appropriate heater for the working fluid used in the heat sink engine 11, taking into consideration the form and amount of available heat.

Superheated vapor exiting heater 26 is delivered through stream D to an inlet 29 of expansion engine 31 where the vapor is expanded isentropically. Within engine 31, energy is extracted from the working fluid and converted to mechanical energy. This mechanical energy is applied to rotate output shaft 32, driving generator 33 to produce electrical power. Appropriate gearing arrangements, or other speed conversion means (not shown) may be used within or in conjunction with output shaft 32, to ensure that the generator is driven at its design speed. After the energy has been extracted from the working fluid, it exits from engine 31 through an outlet 34 as a low-pressure but still superheated vapor.

A vapor line 36 is provided in vaporizer 23, comprising yet another component within working fluid circuit 16. Vapor line 36 is in thermal communication with heat exchanger 24. Stream E interconnects outlet 34 with a first end of vapor line 36, thereby delivering the low-pressure superheated vapor to vaporizer 23. The working fluid within vapor line 36 is cooled by the transfer of heat to heat exchanger 24 and to liquid line 22. As was previously explained, the counter-flowing working fluid in liquid line 22 is vaporized by this heat. Through this process, the heat sink engine 11 has an internal or self-contained heat sink by extracting energy from the working fluid passing through vapor line 36 and transferring it through the heat exchanger 24 to the energy depleted working fluid in liquid form passing through liquid line 22.

The working fluid exiting from the second end of vapor line 36 has been partially condensed by this cooling process into a liquid-vapor state. The working fluid is then passed through stream F to control valve 37. The function of valve 37 is to cause a pressure drop in stream F. Thus, other flow restrictors such as an orifice may be substituted for the valve 37. The output of valve 37 is finally passed through stream G to the working fluid inlet 14 of storage vessel 12. The liquid-vapor mixture is thereby expanded adiabatically into vessel 12, for its temperature to match that of the working fluid in the vessel.

A summary of the primary operation of the dynamic heat sink engine 11 may thus be set forth as follows: a cryogenic working fluid at or near its boiling point is contained in a storage vessel; the working fluid, in a liquid state, is pumped to a higher pressure by a liquid pump; the liquid outputted by the pump is vaporized by a first heat exchanger in a vaporizer; the vaporized working fluid is directed to heater which outputs the vapor in a superheated state; the superheated vapor is expanded isentropically in an expansion engine which transforms a portion of the energy stored in the vapor into mechanical energy; the mechanical energy drives a rotary output shaft coupled to an electrical generator, producing electricity; the working fluid, now in the form of a relatively low-pressure vapor, is partially cooled passing through the heat exchanger in the vaporizer; the heat exchanger transfers heat to the counter-flowing liquid outputted by the liquid pump, providing an internal heat sink for the engine's operation; the partially cooled working fluid exiting from the vaporizer in liquid-vapor state is expanded adiabatically into said storage vessel for its temperature to match that of the working fluid in storage vessel.

The dynamic heat sink engine 11 further includes a vapor outlet 38 and a liquid inlet 39 in communication with the storage vessel 12. A liquifier 41 is provided between outlet 38 and inlet 39. The liquifier can be a heat pump such as a Peltier-effect refrigerator, a cryo-cooler or another device that uses energy to remove heat isobarically from the vaporized working fluid. Liquifier 41 has an inlet 42 in fluid communication through stream H with the vapor outlet 38, and an outlet 43 in fluid communication through stream I with the liquid inlet 39 of the storage vessel. A fraction of the adiabatically expanded working fluid delivered into the storage vessel flashes to vapor phase. This vapor is drawn through the liquifier 41, and is returned to the storage vessel 12 as a liquid. The heat removed from the vapor passing through liquefier 41 is typically dispersed in the air or other medium, such as water.

A second heat exchanger 25 may be provided in thermal communication with the working fluid circuit 16. Preferably, the second heat exchanger 25 is in thermal communication with output stream C, extending between the second end of liquid line 22 and inlet 27 of heater 26. However, it may also be located within stream A or stream B. The second heat exchanger also has fluid circuit 30, having an input line 35 and an output line 40, in thermal communication with a heat exchanger coil 45 within the liquefier 41. Second heat exchanger 25 thereby acts as a heat sink for the liquefier 41, lowering the heating duties of the heater. This results in a smaller size and a lower cost for heater 26. Second heat exchanger 25 also increases the coefficient of performance (COP) of the liquefier by decreasing the high temperature $$T_H : COP = \frac{T_L}{T_H - T_L},$$

where $T_L$ is the temperature of the vapor in stream H, and $T_H$ is the temperature of the medium where the heat is rejected, either into the atmosphere or, into stream C, where second heat exchanger 25 is employed.

Figure 3:
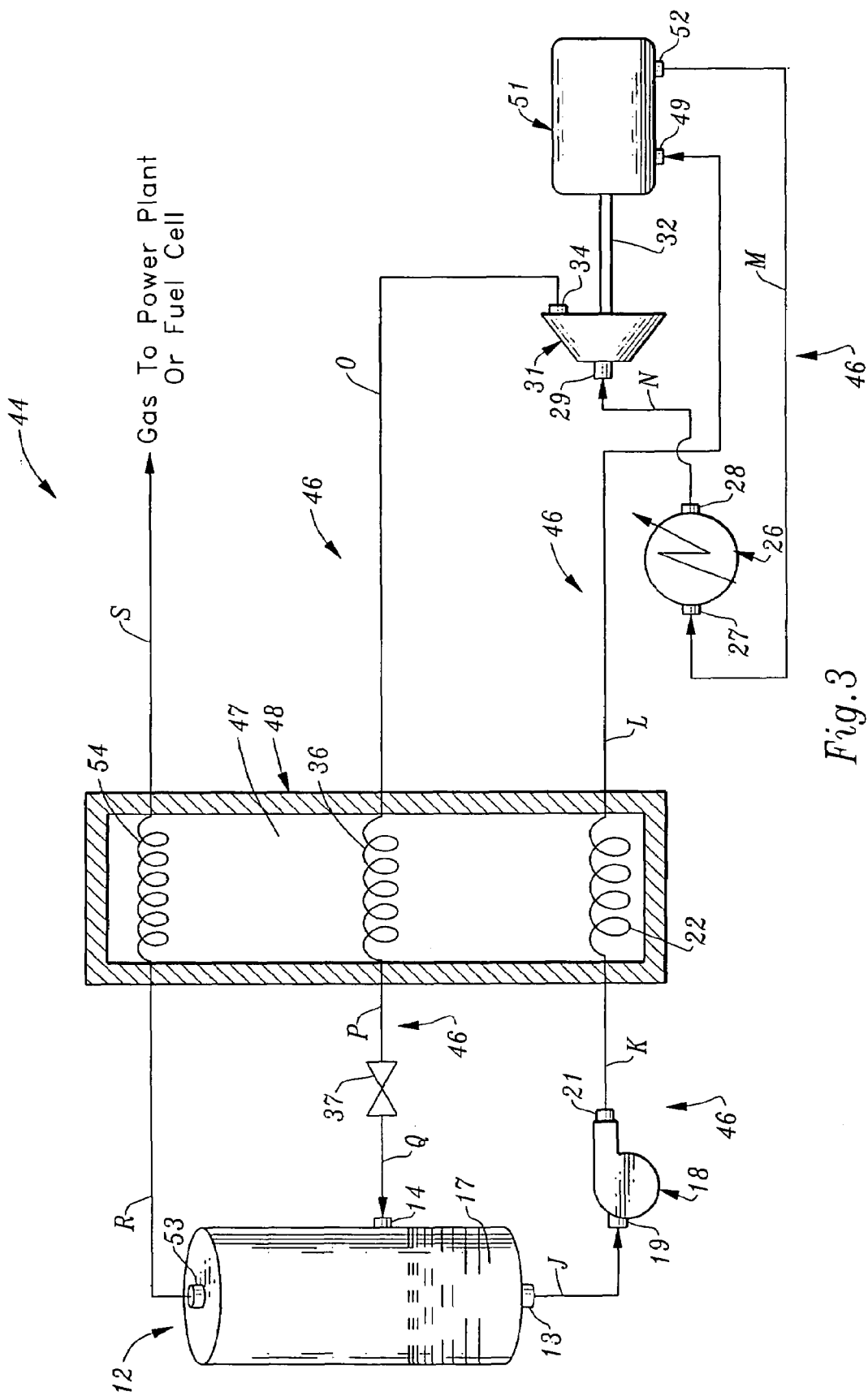

FIG. 3 shows another embodiment of the invention, dynamic heat sink engine 44, which may be used to store energy to assist a conventional power plant during peak electrical demand periods. This embodiment may also be used advantageously to increase the efficiency of a conventional power plant. For clarity, where identical components are employed, the same numerical designations previously used will also be used to describe the dynamic heat sink engine 44 in FIG. 3. Dynamic heat sink engine 44 differs principally in two ways from the dynamic heat sink engine 11 described above. First, heat produced by the generator is employed to pre-heat the working fluid. Second, the working fluid which flashes to a vapor phase in the storage vessel is passed through the vaporizer for reheating so it may be utilized as a fuel for the conventional power plant.

With this as background, the lower portion of the storage vessel 12 shown in FIG. 3 contains the working fluid 17 as a liquid. In this case, working fluid 17 is selected to be methane, hydrogen, or some other combustible fluid so it can be utilized as a fuel in the associated conventional power plant. Storage vessel 12 includes a working fluid outlet 13 and a working fluid inlet 14. A working fluid circuit 46 extends from fluid outlet 13 to fluid inlet 14, and includes a plurality of components serially arranged therein.

The working fluid 17 is passed in liquid form from outlet 13 to pump inlet 19 through a stream J. Pump 18 increases the pressure of the working fluid, and the output is carried through stream K to a first end of liquid line 22. A heat exchanger 47 contained within a vaporizer 48, is in thermal communication with liquid line 22. Heat is thereby transferred to the working fluid within liquid line 22, transforming it into a vapor form. The output of the second end of liquid line 22 is carried through stream L to an input 49 of electrical generator 51. The heat produced through the operation of generator 51 pre-heats the working fluid, and discharges it through output 52.

The pre-heated vapor is passed through stream M to an inlet 27 of heater 26. The vapor form of the working fluid is superheated within heater 27. The superheated vapor is delivered from outlet 28 to inlet 29 of the expansion engine 31, by way of a stream N. The superheated vapor is expanded isentropically in the expansion engine 31. A portion of the energy stored in the superheated vapor is transformed into mechanical energy, driving the rotary output shaft 32 coupled to the electrical generator 51. Generator 51 produces electricity and pre-heats the working fluid, as explained previously.

The working fluid, now in the form of a relatively low-pressure vapor but still superheated, exits from expansion engine 31 through outlet 34. A stream 0 interconnects outlet 34 with a first end of vapor line 36. Vapor line 36 is in thermal communication with heat exchanger 47. The superheated vapor is partially cooled while it passes through heat exchanger 47. The heat exchanger thereby transfers heat to the counter-flowing working fluid outputted by the liquid pump. In this manner, an internal heat sink for the engine's operation is provided.

The partially cooled working fluid exits from the vaporizer 48 in a liquid-vapor state, passing through stream P to a valve 37. The working fluid exits valve 37 through stream Q, and is delivered to fluid inlet 14. The working fluid is expanded adiabatically into the storage vessel 12, so that its temperature matches that of the working fluid in storage vessel.

When the dynamic heat sink engine 44 is called upon to provide peaking power generation, the vapor flash can be left to accumulate in storage vessel 12, or in another vessel, and later liquified during off-peak power production periods. If the engine 44 is used in conjunction with an internal combustion engine, a fuel cell, gas turbine or a conventional power generation plant, a vapor outlet 53 is provided in the upper portion of storage vessel 12. The flashing vapor passes from outlet 53, through stream R to a flash vapor line 54. Because flash vapor line 54 is in thermal communication with heat exchanger 47, vapor passing through that line will be reheated by the condensing vapor passing through vapor line 36. Then, the vaporized fuel is delivered through stream S to provide fuel for a power plant.

In the operation of both engine 11 and engine 44, the net output of the cycle is the power extracted from the output shaft 32 of the expansion engine 31, less the parasitic loads from the liquid pump 18 and the liquifier 41, where applicable. The power output from the engine can be controlled by the flow or pressure delivered by the pump 18.

The following equations are applicable to the operation both of the heat sink engine 11 and the heat sink engine 44:

Governing Equations:

Nomenclature:

$H_i$: fluid enthalpy at stream i $\eta_j$: isentropic efficiency of pump/compressor/expander device j or effectiveness of heat exchanger j.

$W_k$: energy input/output at device k. Sign convention: input<0, output>0

In the following equations, the property subscripts refer to the stream number as per FIG. 1. Since the fluid is recirculating in its entirety, all equations are normalized with respect to mass flow.

The reference enthalpy $H_A$ is that of the liquid entering the pump 18

Energy conservation across the pump 18:

$$W_{18} = \frac{H_A - H_B}{\eta_{18}} < 0 \quad (eq.\ 1)$$

where $H_B$ is the isentropic fluid enthalpy and $\eta_{18}$ is the isentropic efficiency of the pump 18

Heat conservation in Vaporizer 24:

$$H_F - H_E = [(H_B - H_C)] \times \eta_{24} \quad (eq.\ 2)$$

where $\eta_{24}$ is the heat exchanger effectiveness

Heat conservation in Superheater 26:

$$W_{26} = (H_C - H_D) < 0 \quad (eq.\ 3)$$

Energy conservation across the expansion engine 31:

$$W_{31} (H_D - H_E) \times \eta_{31} > 0 \quad (eq.\ 4)$$

where $H_E$ is the isentropic fluid enthalpy and $\eta_{31}$ is the isentropic efficiency of the expansion engine 31.

Energy conservation across expansion valve V1:

$$H_G = H_F \quad (eq.\ 5)$$

Energy conservation at the liquefier L1:

$$\dot{W}_{41} = -H_{G,fg} \times \frac{(1-x)}{\eta_{41}} < 0 \quad (eq.\ 6)$$

where x is the liquid fraction in stream G and $H_{G,fg}$ denotes the heat of vaporization of stream G The engine will produce power if:

$$W_{out} = W_{31} + W_{18} + W_{41} > 0 \quad (eq.\ 7)$$

where $W_{out}$ is the energy produced (if positive) or consumed (if negative) at the expansion engine.

Substituting the devices' energies with equations 1, 4 and 6 yields:

$$\dot{W}_{out} = H_D \times \eta_{31} - H_E \times \eta_{31} + \frac{H_A}{\eta_{18}} - \frac{H_B}{\eta_{18}} - H_{G,fg} \times \frac{(1-x)}{\eta_{41}} \quad (eq.\ 8)$$

Noticing that $H_{G,fg} = H_{H,fg} = H_{fg}$ and that $H_A = H_{G,f} = H_G - H_{fg}(1-x) = H_F - H_{fg}(1-x)$, where x is the liquid fraction in stream G, equation 8 becomes:

$$\dot{W}_{out} = \quad (eq.\ 9)$$
$$H_D \times \eta_{31} - H_E \times \eta_{31} + \frac{H_F}{\eta_{18}} - \frac{H_B}{\eta_{18}} - H_{fg} \times \frac{(1-x)(\eta_{18} + \eta_{41})}{\eta_{18} \times \eta_{41}}$$

By substitution of equation 2, equation 9 becomes:

$$\dot{W}_{out} = -H_B\left(\frac{1-\eta_{24}}{\eta_{18}}\right) - H_C\left(\frac{\eta_{24}}{\eta_{18}}\right) + H_D \times \eta_{31} + \quad (eq.\ 10)$$
$$H_E\left(\frac{1 - \eta_{18} \times \eta_{31}}{\eta_{18}}\right) - H_{fg}(1-x)\left(\frac{\eta_{18} + \eta_{41}}{\eta_{18} \times \eta_{41}}\right)$$

Under the ideal case where $\eta_{18} = \eta_{31} = \eta_{24} = \eta_{41} = 1$, equation 10 becomes:

$$W_{out} = -W_{26} - 2 \times H_{fg}(1-x) \quad (eq.\ 11)$$

Since $W_{26}$ is negative by convention, the ideal cycle will produce energy whenever $$[-W_{26}] > 2 \times H_{fg} \times (1-x) \quad (eq.\ 12)$$

Equation 12 shows the implicit relationship between the fluid of choice and the amount of superheat required for the cycle to be sustainable.

It is also possible to calculate the ideal (or limiting) efficiency of the cycle:

$$\eta_{cycle} = \frac{Q_{out}}{Q_{in}} \quad (eq.\ 13)$$
$$= \frac{\dot{W}_{out}}{-\dot{W}_{26}}$$

-continued $$= 1 - 2 \times \left( \frac{H_{fg} \times (1-x)}{[-\dot{W}_{26}]} \right)$$

What is claimed is:

1. A dynamic heat sink engine, comprising:
   a. a storage vessel, having a working fluid outlet, a working fluid inlet, a vapor outlet, and a liquid inlet, a lower portion of said storage vessel containing a working fluid in liquid form, at or near its boiling point;
   b. a first working fluid circuit extending between said working fluid outlet and said working fluid inlet;
   c. a liquid pump having an inlet and an outlet, a first stream of said first working circuit extending between said working fluid outlet and said pump inlet;
   d. a vaporizer having a liquid line and a vapor line passing therethrough, said vaporizer including heat exchanger means therein in thermal communication with said liquid line and said vapor line, a second stream of said first working circuit extending between said pump outlet and a first end of said liquid line;
   e. a heater having an inlet and an outlet, a third stream of said first working circuit extending between a second end of said liquid line and said inlet of said heater;
   f. an expansion engine having an inlet, an outlet, and a rotary output shaft a fourth stream of said first working circuit extending between said outlet of said heater and said inlet of said expansion engine;
   g. an electrical generator connected to said rotary output shaft of said expansion engine;
   h. a fifth stream of said first working circuit extending between said outlet of said expansion engine and a first end of said vapor line;
   i. a sixth stream of said first working circuit extending between a second end of said vapor line and said working fluid inlet, whereby working liquid is pumped to a higher pressure by said pump, vaporized by said heat exchanger means, further heated by said heater, expanded isentropically in said expansion engine whereby said rotary output shaft drives said generator producing electricity, and whereby said working fluid passes through said fifth stream of said first working circuit in a super-heated state and at a pressure that is higher than the pressure in said storage vessel, said working fluid is partially cooled passing through said heat exchanger means and passes through said sixth stream of said first working circuit and expanded adiabatically into said storage vessel for its temperature to match that of the fluid in said vessel.

2. A dynamic heat sink engine as in claim 1 in which said storage vessel further includes a vapor outlet and a vapor flash line in said vaporizer, said vapor flash line being in thermal communication with said heat exchanger, and said vapor outlet and said vapor flash line being in fluid communication, whereby vapor heated within said vapor flash line is further heated in said vaporizer and outputted as fuel.

3. A dynamic heat sink engine as in claim 1 in which said working fluid is hydrogen, helium, or methane.

4. A dynamic heat sink engine as in claim 1 in which said generator includes a vapor inlet and a vapor outlet, and in which said vapor inlet and said vapor outlet are interposed between said second end of said liquid line and said inlet of said heater, whereby heat generated by said generator preheats the working fluid.

5. A dynamic heat sink engine as in claim 1, further including flow restrictor means within said sixth stream of said first working circuit.

6. A dynamic heat sink engine as in claim 1, further including either a valve or an orifice within said sixth stream of said first working circuit.

7. A dynamic heat sink engine as in claim 1 in which said storage vessel further includes a vapor outlet, a liquid inlet, and a liquifier, said liquifier having an inlet in fluid communication with said vapor outlet and an outlet in fluid communication with said liquid inlet of said storage vessel, whereby a fraction of said adiabatically expanded fluid flashes to vapor phase and passes through said liquifier, and is returned to said storage vessel as a liquid.

8. A dynamic heat sink engine as in claim 7 in which said liquifier is a cryo-cooler.

9. A dynamic heat sink pump as in claim 7 in which said liquifier comprises means using energy to remove heat isobarically from said working fluid.

10. A dynamic heat sink engine as in claim 7 including second heat exchanger means in thermal communication with said third stream of said first working circuit and a fluid circuit having an input line and an output line in thermal communication with said liquifier and said second heat exchanger means.

11. A dynamic heat sink engine as in claim 7 in which said liquifier is a heat pump.

12. A dynamic heat sink engine as in claim 11 in which said heat pump is a Peltier-effect refrigerator.

13. A dynamic heat sink engine, comprising:
   a. a storage vessel, having a working fluid outlet and a working fluid inlet, a vapor outlet, a liquid inlet, and a liquifier, said liquifier having an inlet in fluid communication with said vapor outlet and an outlet in fluid communication with said liquid inlet of said storage vessel, a lower portion of said storage vessel containing a working fluid in liquid form, at or near its boiling point;
   b. a working fluid circuit extending between said working fluid outlet and said working fluid inlet, said working fluid circuit including, in serial connection therein: a pump; a vaporizer having a liquid line passing therethrough; a heater; an expansion engine having a rotary output shaft; an electrical generator connected to said rotary output shaft of said expansion engine; a vapor line passing through said vaporizer, said vaporizer including heat exchanger means therein in thermal communication with said liquid line and said vapor line, whereby working liquid is pumped to a higher pressure by said pump, vaporized by said heat exchanger means, further heated by said heater, expanded isentropically in said expansion engine whereby said rotary output shaft drives said generator producing electricity, and whereby said working fluid exits from said expansion engine in a super-heated state and at a pressure that is higher than a pressure within said storage vessel, said working fluid is partially cooled passing through said heat exchanger means and is expanded adiabatically into said storage vessel for its temperature to match that of the working fluid in said vessel and a fraction of said adiabatically expanded fluid flashes to vapor phase and passes through said liquifier, and is returned to said storage vessel as a liquid.

14. A dynamic heat sink engine as in claim 13 in which said liquifier is a cryo-cooler.

15. A dynamic heat sink pump as in claim 13 in which said liquifier comprises means using energy to remove heat isobarically from said working fluid.

16. A dynamic heat sink engine as in claim 13 in which said storage vessel further includes a vapor outlet and a vapor flash line is provided in said vaporizer, said vapor flash line being in thermal communication with said heat exchanger, and said vapor outlet and said vapor flash line being in fluid communication, whereby vapor heated within said vapor flash line is further heated in said vaporizer and outputted as fuel.

17. A dynamic heat sink engine as in claim 13 in which said working fluid is hydrogen, helium, or methane.

18. A dynamic heat sink engine as in claim 13 in which said generator includes a vapor inlet and a vapor outlet, and in which said vapor inlet and said vapor outlet are interposed between said second end of said liquid line and said inlet of said heater, whereby heat generated by said generator preheats the working fluid.

19. A dynamic heat sink engine as in claim 13 further including flow restrictor means between said working fluid inlet and said vapor line to effect a reduction in vapor pressure.

20. A dynamic heat sink engine as in claim 13 further including either a valve or an orifice between said working fluid inlet and said vapor line.

21. A dynamic heat sink engine as in claim 13 including second heat exchanger means in thermal communication with said working fluid circuit between said vaporizer and said heater, further including a fluid circuit having an input line and an output line in thermal communication with said liquifier and said second heat exchanger means.

22. A dynamic heat sink engine as in claim 13 in which said liquifier is a heat pump.

23. A dynamic heat sink engine as in claim 22 in which said heat pump is a Peltier-effect refrigerator.

24. A dynamic heat sink engine, comprising:
 a. a storage vessel, having a working fluid outlet, a working fluid inlet, and a vapor outlet, a lower portion of said storage vessel containing a working fluid in liquid form, at or near its boiling point;
 b. a working fluid circuit extending between said working fluid outlet and said working fluid inlet, said working fluid circuit including, in serial connection therein: a pump; a vaporizer having a liquid line passing therethrough; a heater; an expansion engine having a rotary output shaft; an electrical generator connected to said rotary output shaft of said expansion engine; a vapor line passing through said vaporizer, said vaporizer including heat exchanger means therein in thermal communication with said liquid line and said vapor line, and said vaporizer further including a vapor flash line therein, said vapor flash line being in thermal communication with said heat exchanger, and said vapor outlet and said vapor flash line being in fluid communication, whereby working liquid is pumped to a higher pressure by said pump, vaporized by said heat exchanger means, further heated by said heater, expanded isentropically in said expansion engine whereby said rotary output shaft drives said generator producing electricity, and whereby said working fluid exits from said expansion engine in a super-heated state and at a pressure that is higher than a pressure within said storage vessel, said working fluid is partially cooled passing through said heat exchanger means and is expanded adiabatically into said storage vessel for its temperature to match that of the working fluid in said vessel, and whereby vapor heated within said flash line is further heated in said vaporizer and outputted as fuel.

25. A dynamic heat sink engine as in claim 24 in which said working fluid is hydrogen, helium, or methane.

26. A dynamic heat sink engine as in claim 24 in which said generator includes a vapor inlet and a vapor outlet, and in which said vapor inlet and said vapor outlet are interposed between said second end of said liquid line and said inlet of said heater, whereby heat generated by said generator preheats the working fluid.

27. A dynamic heat sink engine as in claim 24 further including flow restrictor means between said working fluid inlet and said vapor line to effect a reduction in vapor pressure.

* * * * *